H. P. GUILLO.
CHART BOX AND COURSE INDICATOR.
APPLICATION FILED MAY 11, 1908.

964,773.

Patented July 19, 1910.
2 SHEETS—SHEET 1.

Witnesses

Inventor
Harry P. Guillo,
by
Mitchell, Chadwick & Kent,
Attorneys.

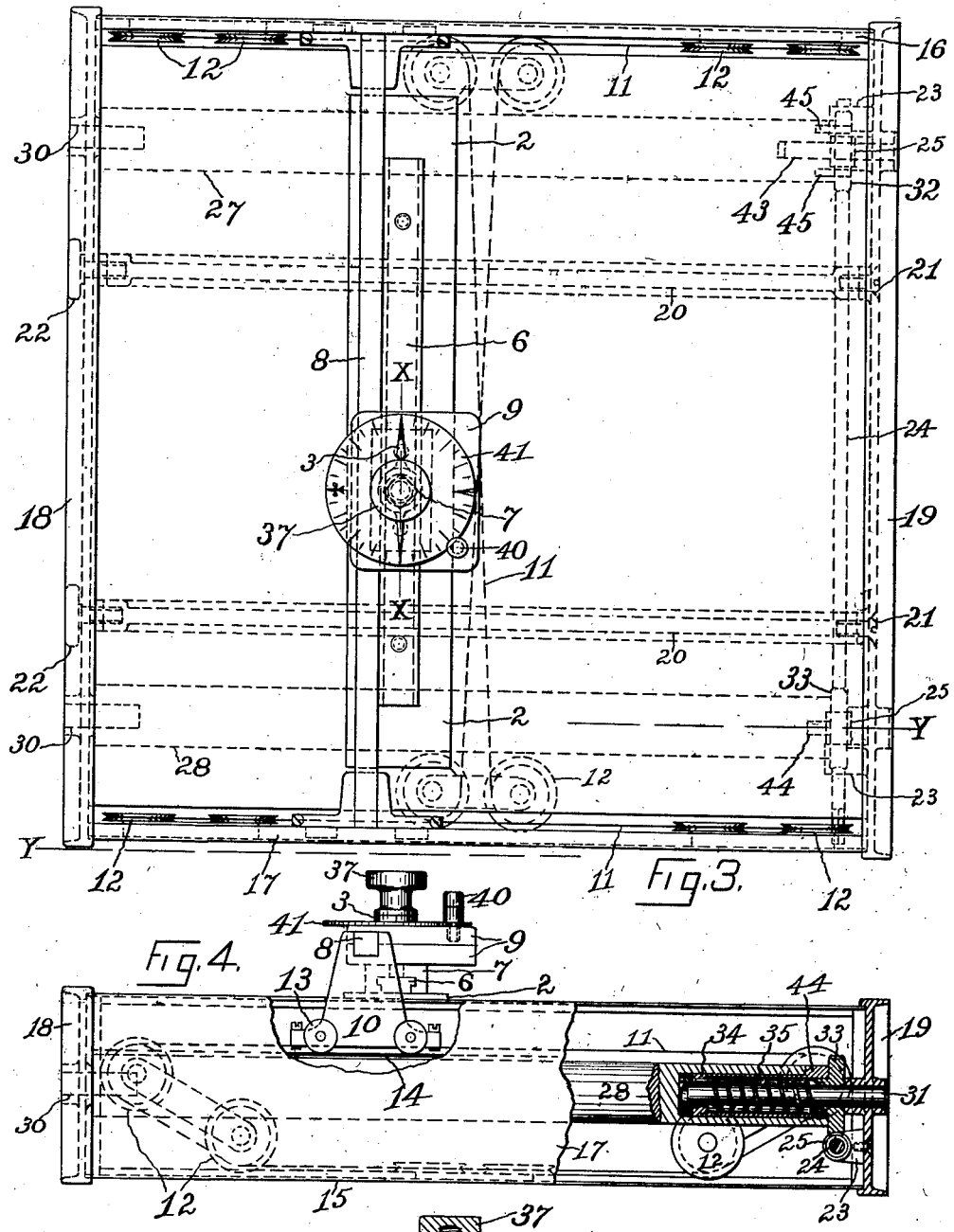

UNITED STATES PATENT OFFICE.

HARRY PRESCOTT GUILLO, OF REVERE, MASSACHUSETTS.

CHART-BOX AND COURSE-INDICATOR.

964,773.

Specification of Letters Patent.  Patented July 19, 1910.

Application filed May 11, 1908. Serial No. 432,072.

*To all whom it may concern:*

Be it known that I, HARRY PRESCOTT GUILLO, a citizen of the United States, and resident of Revere, in the county of Suffolk and State of Massachusetts, have invented new and useful Improvements in Chart-Boxes and Course-Indicators, of which the following is a specification.

My invention is a chart box and course indicator, a principal feature of which is an arrangement whereby one or more charts or maps may be suitably stored in such fashion that any portion of the chart may be exposed to view, in connection with a bridge, actuated and controlled by a parallel motion, and carrying an adjustable course indicator and adjustable compass-face, whereby, the compass-face having been adjusted in accord with the compass diagram upon the chart, the bridge and its associate parts being moved as desired, the course indicator may be set between the ship's position and the objective and the course immediately read off upon the compass-face.

Figure 1:
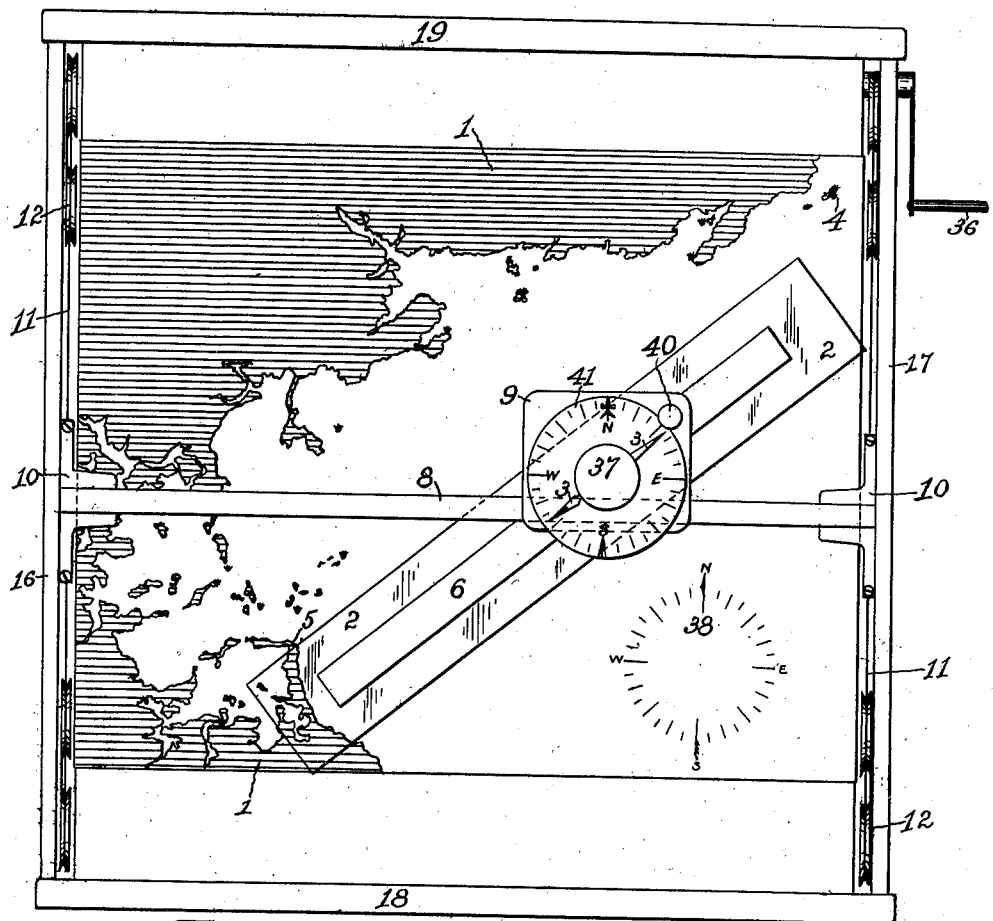
Figure 2:
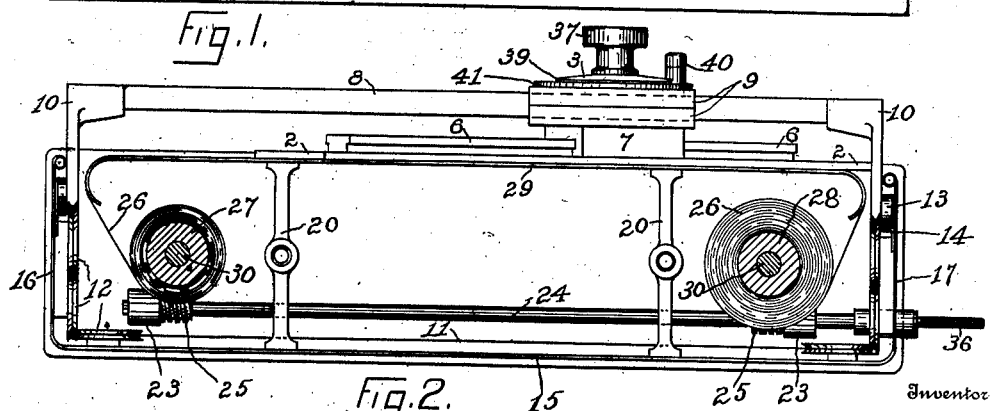

In the drawings:—Figure 1 is a plan view of my device showing a chart in position; Fig. 2 is a side view with a side of the box removed to show the interior mechanism; Fig. 3 is a plan view showing the interior mechanism in dotted lines; Fig. 4 is an end view of Fig. 3 broken away in parts and also showing interior mechanism in part in dotted lines; and Fig. 5 is a vertical, central section of the indicator mechanism.

In Fig. 1, I have shown a chart and the indicator in position to point a course from point 4 to 5 or from point 5 to 4 according to the position of the vessel and the direction in which it is proceeding. The straight edge 2, which is preferably of some transparent material such as celluloid, is connected to and has a fixed relation with pointer 3, so that pointer 3 follows accurately the movements of straight edge 2. Straight edge 2 carries fast thereto a guide piece 6, T shaped in cross section (see Fig. 4) and this guide slides in ways in the base of a stud 7. Stud 7 carries upon a cylindrical portion of its length, the two parts of a block 9, which are respectively grooved across their opposed faces to receive the bridge 8. Above block 9, on stud 7, is mounted a compass-face 41, which lies upon the upper surface of block 9 and may be clamped in any adjusted position to which it may be turned by a thumb bolt 40 which screws into block 9 (see Figs. 1 and 4). Above compass face 41, upon stud 7 is a squared portion, upon which is mounted a pointer 3, its longitudinal axis coincident with the longitudinal axis of the straight edge 2. Above the pointer 3 upon the stud 7 is a screw threaded portion of the stud, upon which is mounted a cap nut 37. The squared portion of the stud 7 upon which pointer 3 is organized is not as long as the thickness of pointer 3. The bridge 8 is carried by movable supports 10, running on wheels 13 on track 14, and controlled by wires 11 and guide sheaves 12, forming a parallel motion, which keeps the bridge 8 always at a true angle, across the chart box, as the bridge is moved from place to place, in use and operation.

The chart box is preferably made with the bottom 15 and sides 16 and 17 integral, the ends 18 and 19 being clamped into position by means of the longitudinal members 20, screws 21 and thumb screws 22. Mounted upon the inside of end 19 are worm shaft bearings 23 carrying worm shaft 24 with its worms 25. The chart or charts are mounted upon a web 26, one end of which is secured to roll 27 and the other end to roll 28, the web, between the two rolls, passing over table 29, which is clamped and held in proper position, between ends 18 and 19 and may also be secured to the longitudinal or frame members 20, as is the bottom 15. Roll 27 is mounted on trunnions 30 at one end and shaft 43 at its other end, and roll 28 is similarly mounted upon trunnions 30 and shaft 31. Roll 27 is fastened to worm wheel 32 and roll 28 is connected to worm wheel 33 by sleeve 34 and spring 35, as shown in Fig. 4. The roll 28 is connected to the sleeve 34 by a lug 44 and roll 27 is connected to the worm wheel 32 by pins 45.

The chart or charts may be mounted upon the web 26 in any suitable manner, for example by stitching or the use of an adhesive material. I prefer to secure it or them upon the web by covering the surface of the web with a glue containing a certain percentage of glycerin, which without materially affecting the adhesive qualities of the glue prevents it from becoming stiff, keeping it flexible. The chart is laid smoothly upon the web thus treated and adheres thereto.

The operation is as follows:—It will be obvious that by a combination of the movement of the bridge 8 and of the block 9 along the bridge, and of the turning of the straight edge upon the stud 7 as a pivot, the straight edge may be positioned anywhere over the portion of the chart that is exposed. When the chart is properly positioned beneath the field over which the straight edge 2 can travel and with the nut 37 loosened, the operator shifts the straight edge until it rests over the compass diagram 38 of the chart with one of its long edges coincident with the north magnetic line of the diagram. The pointer 3 will then occupy a corresponding position. With all parts in the above condition, the clamp screw 40 is loosened and the graduated compass-face 41 is set to correspond with the pointer 3 and the compass diagram 38. The compass-face being properly adjusted is clamped to the block 9 by the screw 40. Now, if the straight edge is laid between any two points on the chart the pointer 3 will indicate the course upon the compass-face, as shown in Fig. 1, in which the course is either S. W. 1/2 W. or N. E. 1/2 according to the position of the vessel and the direction in which it is proceeding.

To clamp the straight edge in any desired position, the nut 37 is screwed up, thus clamping together all those elements through which the stud 7 passes and clamping the two parts of block 9 upon bridge 8. The under side of block 9 carries two studs or struts 42 (Fig. 5) which pass through the base of the stud 7 and rest upon the upper surface of guide 6 which is of T section and slides in ways in the base of stud 7. It will be obvious that the tightening of nut 37 will draw up stud 7 and guide 6 and straight edge 2 which are carried in the base of stud 7 and also that in the operation pressure will be communicated through struts 42 to block 9 and the other elements mounted upon stud 7 so that everything mounted on or fixed to the stud will be clamped in position.

In moving web 26 by turning the handle 36, rolls 27 and 28 are turned in the same direction by worms 25 and wheels 32 and 33, and as the web and charts are rolled on one roll and the peripheral speed of the roller and its load increase, the other correspondingly diminishes. The coiled spring 35 interposed between worm wheel 33 and roll 28 will compensate for this drawing speed variation of the two rollers.

I claim:—

1. The chart box and course indicator above described, made up of a chart table; a bridge movable back and forth over the chart table, said bridge being attached at either end to a parallel motion device upon the chart table; that parallel motion device; a block movable back and forth along the bridge; a pivot pin passing through said block; an indicator pivotally mounted upon the block and made up of a straight edge slidably secured to the bottom of said pivot pin; a pointer secured to the upper end of the pin and a compass face upon the upper side of the block, adjustable to correspond with the compass diagram of the chart by means of the straight edge and pointer and coöperating with the straight edge and pointer to indicate the course when the straight edge is set between the ship's position and the objective, substantially as described.

2. The chart box and course indicator above described, made up of a chart table; a bridge movable back and forth over the chart table, a block movable back and forth along the bridge; a pivot pin passing through said block; an indicator mounted upon the block and made up of a straight edge and pointer secured respectively to the lower and upper ends of said pivot pin in combination with an adjustable compass face upon the upper side of the block; a pair of rollers upon which the chart is rolled, and means to rotate the rollers to wind the chart from one roller to the other across the chart table; substantially as described.

3. The chart box and course indicator as above described made up of a chart table; a bridge movable back and forth over the chart table; a block movable back and forth along the bridge; a pin passing vertically through the block; a pointer upon the upper end of the pin; a straight edge secured upon the lower end of the pin, the pointer and straight edge being secured upon the pin in a known relation and against independent movement; an adjustable compass face upon the upper side of the block, centered upon the vertical axis of the pin, in combination with a chart adapted to be moved across the chart table and beneath said pointer and said straight edge, substantially as described.

Signed by me at Boston, Suffolk county, Massachusetts, this fifth day of May, 1908.

HARRY PRESCOTT GUILLO.

Witnesses:
 JOSEPH T. BRENNAN,
 ANNA B. LINDSAY.